Nov. 14, 1939.                H. W. DIETERT                2,179,687
                            METERING DEVICE
                       Original Filed May 24, 1937
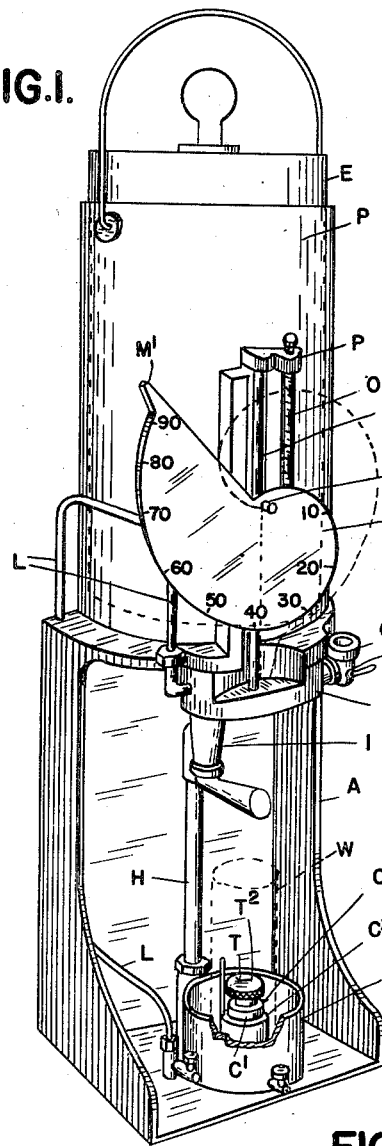
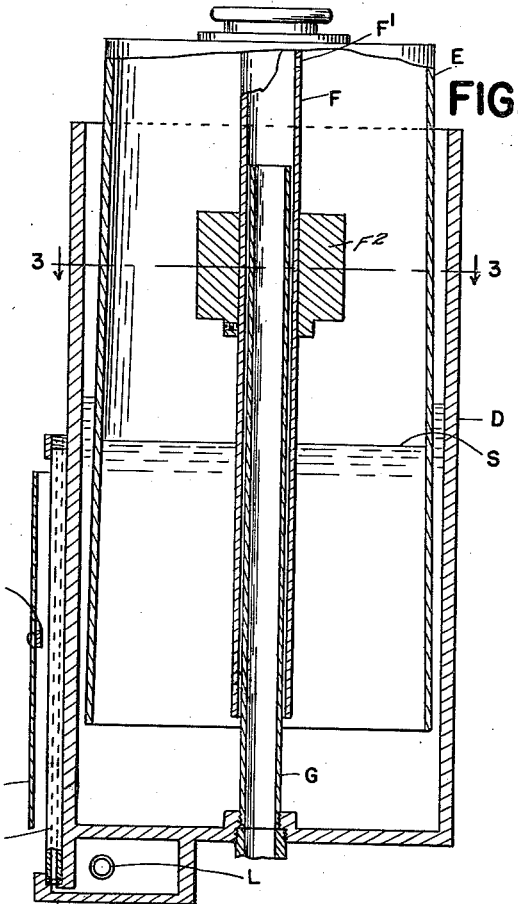
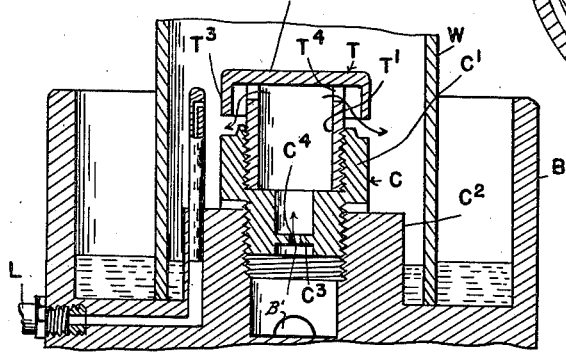
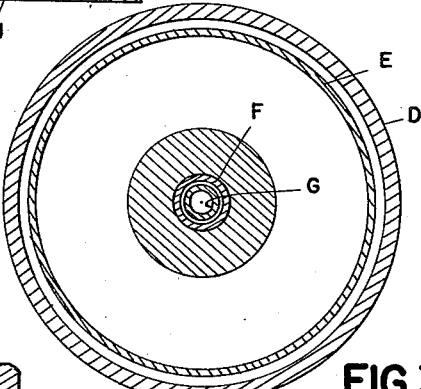
INVENTOR
HARRY W. DIETERT
BY
ATTORNEYS Patented Nov. 14, 1939

2,179,687

UNITED STATES PATENT OFFICE 2,179,687

METERING DEVICE

Harry W. Dietert, Detroit, Mich.

Original application May 24, 1937, Serial No. 144,537. Divided and this application November 8, 1937, Serial No. 173,512

3 Claims. (Cl. 138—41)

This invention relates to instruments of the type used in testing the porosity or permeability of molding material such as sand used for forming molds and cores, and constitutes a division of my application filed May 24, 1937, bearing Serial No. 144,537.

One of the essential objects of the invention is to provide an efficient device that will insure uniformity and accuracy of measurement.

Another object is to provide a device of this type wherein provision is made for guarding against the collection of dust, dirt, sand particles, etc., in the metering nozzle thereof.

Another object is to provide a relatively simple construction which can be manufactured at a comparatively low cost.

Other objects, advantages and novel details of construction of this invention will be made more apparent as this description proceeds, especially when considered in connection with the accompanying drawing, wherein:

Figure 1 is a perspective view of the instrument;

Figure 2 is a vertical central section through the gasometer;

Figure 3 is a horizontal section on line 3—3 of Figure 2;

Figure 4 is a vertical central section through the metering means and protective cap therefor.

As shown in Figure 1, A is a suitable frame having mounted on the base thereof the cup B for holding a mercury seal and having arranged centrally thereof the metering nozzle C. On top of the base A is the gasometer including the outer tank D and bell E. This bell has an axially extending guide tube F which engages a cooperating guide tube G forming the air discharge from the gasometer and extending downward through the base of the tank D. A weight $F^2$ for the bell E is mounted upon the tube F. Below this tank it is connected by a conduit H containing a valve or stop cock I with a channel B' within the cup B connecting with a nipple $C^2$ in which the metering nozzle C is mounted. At the base of the outer tank D is a hollow block J forming a container for liquid, and a transparent gauge tube K, having its lower end submerged in the liquid of the cup, rises from the block outside of the tank. A tube L connected with an air space above the liquid in the block J extends therefrom to the cup B and communicates with the passage connected to the conduit H. Mounted on the side of the tank is a scale M which is rotatable on a pivot N, the latter being vertically adjustable in position by a screw O engaging a bracket P. There is further a fill cup Q on the side of the hollow block J for placing water in the chamber therein, and a valve or stop cock R for closing the connection.

With the construction as thus far described, when the tank D is filled with water to a predetermined level, such as indicated by the line S, the weight of the bell E, which is partially submerged in the water, will develop a predetermined pressure on the air contained therein. Whenever the valve I is opened the air from the bell will be discharged through a port F' into the upper end of the tubular guide F and through the guide tube G and conduit H to the cup B. Assuming that the sample to be tested is placed in a tube such as W which is engaged with the mercury seal in the cup B, the air discharged into this tube will gradually escape through the sand. The porosity or permeability of the sample is determined by the rate of flow through the sand which in turn is very accurately determined by the fall of the bell E in any given interval of time. Another test which can be more quickly made is by measuring the pressure in the tube below the sample. This is accomplished by the tube L which communicates the pressure of air in the sample tube W to the chamber in the hollow block J above the water therein, and which results in forcing water upward in the gauge tube K. By then turning the spiral scale M upon the pivot N until its periphery is at the height of the water in the gauge tube, the calibrations on the scale will indicate the permeability of the sample. Accuracy in this latter test is obtained by first vertically adjusting the pivot N for the scale M through the screw O, so that at atmospheric pressure its tip end M' will be at the exact height of the liquid in the gauge K.

The metering device for the passage of air from the conduit H to the space within the test tube is preferably a bushing C' which is screwed into a nipple $C^2$ in the cup B and is provided with an open top chamber 5 and an inlet passage 6 for air. Located in the inlet passage 6 is an orifice plate $C^3$ having a very accurately calibrated orifice $C^4$ therethrough. To maintain this orifice at the exact dimension its wall is formed by a non-corrodable metal, such as gold plate, but this alone will not insure uniformity. Thus, a very slight amount of dust from the sand in the sample tested, if collected in the orifice, will alter the rate of flow of air therethrough. I guard against such a result by the provision of a cap T having a tubular portion T' for screwing into the bushing C' and an imperforate top $T^2$ extending radially outward and terminating in a down-turned annular flange $T^3$. The tubular portion $T'$ has ports $T^4$ therethrough adjacent to the top wall $T^2$, thereby permitting flow of air from the orifice $C^4$ outward and into the test tube W. However, any dust which might be held in suspension in the air within the tube is prevented from access to the metering orifice $C^4$, inasmuch as this would necessitate passing upward within the annular flange $T^3$ against the direction of flow of current and then passing through the ports $T^4$ and downward within the tubular portion $T'$. I have found that the provision of the annular flange $T^3$ depending below the ports $T^4$ much more effectively guards against access of dust to the orifice $C^4$ than merely a horizontal flange above said ports.

What I claim as my invention is:

1. A metering device of the class described comprising an upright bushing attachable at its lower end to a part of a mercury cup, said bushing being provided at its lower end with an axially extending inlet passage for air and provided at the upper end of said passage with an open top chamber for receiving air from said passage, means restricting the flow of air through said passage to said chamber including an orifice plate in said passage and having an accurately calibrated orifice therethrough, and means for guarding said orifice against dust and other foreign matter including a cap having a tubular part secured to said chamber and projecting thereabove and having an imperforate cover part extending over the upper end of said tubular part, said cover part extending radially outward and terminating in a downturned annular flange substantially concentric with said tubular part, one side of the tubular part being provided at the upper end thereof above the lower edges of said downturned flange with a port permitting unrestricted flow of air from the orifice outward to the space between the concentric tubular part and downturned flange of said cap.

2. A metering device of the class described comprising an upright bushing attachable at its lower end to a suitable support, said bushing being provided at its lower end with an inlet passage for air and provided at the upper end of said passage with a chamber for receiving air from said passage, means restricting the flow of air through said passage to said chamber including an orifice plate extending transversely of said passage and having an accurately calibrated orifice therethrough, a tubular member for receiving air from the orifice secured to said chamber and projecting thereabove, one side of said tubular member being provided at the upper end thereof with an outlet port for air, and means at the upper end of said tubular member serving as a common guard or shield for said orifice and outlet port.

3. A metering device of the class described comprising an upright bushing attachable at its lower end to a suitable support, said bushing being provided at its lower end with an inlet passage for air and provided at the upper end of said passage with a chamber for receiving air from said passage, accurately calibrated means in said passage restricting the flow of air through said passage to said chamber, and means for guarding said accurately calibrated means against dust and other foreign material including a cap having a tubular part secured to said chamber and projecting thereabove and having an imperforate cover part extending over the upper end of said tubular part, said cover part extending radially outward and terminating in a downturned annular flange substantially concentric with said tubular part, one side of the tubular part being provided at the upper end thereof above the lower edges of said downturned flange with a port permitting unrestricted flow of air from the accurately calibrated means outward to the space between the concentric tubular part and downturned flange of said cap.

HARRY W. DIETERT.